United States Patent
Bell

(10) Patent No.: US 12,303,962 B2
(45) Date of Patent: May 20, 2025

(54) DEVICE AND METHOD FOR MAKING EFFICIENT Y-PIPES

(71) Applicant: ROLLS-ROYCE plc, London (GB)

(72) Inventor: Colin A Bell, Derby (GB)

(73) Assignee: ROLLS-ROYCE plc, London (GB)

( * ) Notice: Subject to any disclaimer, the term of this patent is extended or adjusted under 35 U.S.C. 154(b) by 253 days.

(21) Appl. No.: 18/185,040

(22) Filed: Mar. 16, 2023

(65) Prior Publication Data

US 2023/0302518 A1   Sep. 28, 2023

(30) Foreign Application Priority Data

Mar. 22, 2022   (GB) ..................................... 2203992

(51) Int. Cl.
*B21D 7/06* (2006.01)
*F16L 41/02* (2006.01)

(52) U.S. Cl.
CPC .............. *B21D 7/06* (2013.01); *F16L 41/023* (2013.01)

(58) Field of Classification Search
CPC . B21D 7/02; B21D 7/022; B21D 7/03; B21D 7/06; B21D 7/063; B21D 7/12; B21D 7/162; B21D 7/14; B21D 5/14; B21D 3/10; B21D 3/14; B21D 3/16; B21D 11/00
See application file for complete search history.

(56) References Cited

U.S. PATENT DOCUMENTS

| | | | |
|---|---|---|---|
| 2,766,513 A | 10/1956 | Huet | |
| 3,851,518 A * | 12/1974 | Spengler | B21D 7/06 72/380 |
| 4,854,150 A * | 8/1989 | Brown | B21D 11/10 72/383 |
| 4,944,147 A * | 7/1990 | Finnegan | B21D 7/06 59/56 |
| 2010/0212134 A1* | 8/2010 | Kohno | B21D 11/10 29/33 R |

FOREIGN PATENT DOCUMENTS

| | | |
|---|---|---|
| CN | 106001155 A | 10/2016 |
| CN | 107876673 A | 4/2018 |
| CN | 109513798 A | 3/2019 |
| CN | 111570696 A | 8/2020 |
| CN | 212760508 U | 3/2021 |
| GB | 747524 A | 4/1956 |
| KR | 10-0767813 B1 | 10/2007 |

OTHER PUBLICATIONS

Aug. 10, 2023 extended Search Report issued in European Patent Application No. 23158999.5.

* cited by examiner

*Primary Examiner* — Teresa M Ekiert
(74) *Attorney, Agent, or Firm* — Oliff PLC

(57) ABSTRACT

A device for making efficient Y-pipes has a first piece configured to hold a Y-pipe that has a holder portion and a jaws portion, the jaws portion being moveable between a first configuration and a second configuration, a second piece configured to be inserted into the vertex of a Y-pipe that has a wedge portion and a punch portion, the wedge portion being configured to be inserted into the vertex of a Y-pipe and the punch portion having a tip and fitting at least partially within the wedge portion and being moveable with relation to the wedge portion between a retracted position and an extended position, and a control system configured to control the movement of the jaws portion and the punch portion such that a Y-pipe held between the first piece and second piece has its vertex angle decreased.

12 Claims, 6 Drawing Sheets

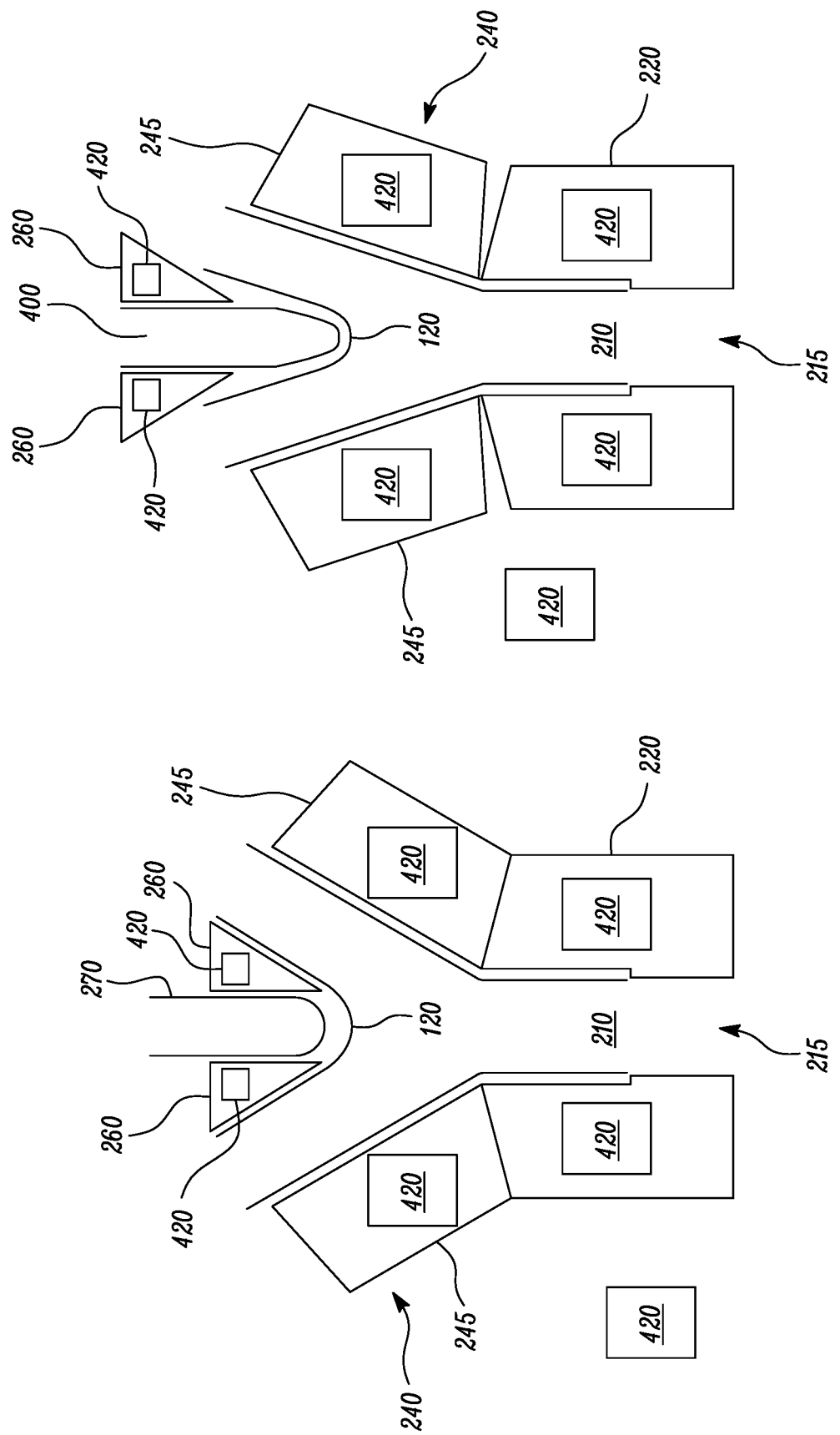

DEVICE AND METHOD FOR MAKING EFFICIENT Y-PIPES

CROSS-REFERENCE TO RELATED APPLICATIONS

This specification is claims priority pursuant to 35 U.S.C. § 119(a) to United Kingdom patent application GB 2203992.9 filed on Mar. 22, 2022, which application is incorporated herein by reference it its entirety.

BACKGROUND

Field of the Disclosure

The present disclosure relates to a device, and a method, for decreasing the vertex angle of a Y-pipe.

Description of the Related Art

The design of pipes (e.g. tubes, conduits, etc.) used to transport fluids of various types (e.g. gasses and liquids) has to take into account the dynamics of the fluid. For example, it is generally desirable not to design pipes that would create excessive eddy currents, which could lead to stagnant flow in some parts of the fluid. Speed of flow is another consideration, which is particularly relevant where the pipe bends, or has a junction where flows split or combine. For example, where it is necessary to split the flow, fluid will flow faster through a Y-shaped junction than it will through a T-shaped junction, because the angle the fluid is made to turn through at the split is smaller in a Y-shaped pipe (or "Y-pipe") than a T-shaped pipe. Indeed, the smaller the angle of the Y vertex (i.e. the angle between the two legs formed by the split in the pipe), the faster the fluid can flow through the Y-pipe.

The process for constructing a Y-pipe is, however, not without its difficulties.

Prior art methods include welding two parts together, or hydroforming.

The advantage of welding two parts together is that sharper angles between the legs of the Y are possible, but this comes at the cost of welding seams which are potential points of weakness and flow disturbance within the pipe.

Hydroforming eliminates the need for welding and the consequent seams, but it results in the Y-pipe having a much larger vertex angle, as metal cannot readily be hydroformed around sharp corners.

There is therefore a need for a means of providing a Y-pipe with a small vertex angle that does not have weld seams or at least provides a useful alternative to known Y-pipes.

SUMMARY OF THE DISCLOSURE

According to a first aspect there is provided a device for decreasing the vertex angle of a Y-pipe, the device comprising a first piece configured to hold the Y-pipe, the first piece comprising a holder portion and a jaws portion, the jaws portion being moveable with relation to the holder portion between at least a first configuration and a second configuration, wherein, in the first configuration the holder portion and jaws portion form a holder for the Y-pipe with the jaws portion forming a first angle, and in the second configuration the holder portion and jaws portion form a holder for the Y-pipe with the jaws portion forming a second angle which is less than the first angle; and a second piece configured to be inserted into the vertex of the Y-pipe, the second piece comprising a wedge portion and a punch portion, the wedge portion be configured to be inserted into the vertex of the Y-pipe and the punch portion having a tip and fitting at least partially within the wedge portion and being moveable with relation to the wedge portion between a retracted position and an extended position, wherein, in the retracted position the tip of the punch portion is in a first position with respect to the wedge portion, and in the extended position the tip of the punch portion is in a second position with respect to the wedge portion, the second position being closer to the holder portion of the device than the first position; the device further comprising a control system configured to control the movement of the jaws portion and the punch portion such that the movement of the jaws portion between the first configuration and the second configuration is synchronised with the movement of the punch portion between the retracted position and the extended position such that the Y-pipe held between the first piece and second piece has its vertex angle decreased.

Such a device provides an easy and reliable means for creating Y-pipes having a sharp vertex without creating points of weakness in the Y-pipe, or protrusions that will disturb the flow of fluid through the Y-pipe.

The punch portion can be swappable, such that different punch portions having different tip profiles can be used within the wedge portion. Such a feature allows for careful control over the shape of the Y-pipe vertex.

The holder portion can be configured to only be in contact with a part of the Y-pipe that has a cylindrical shape. The jaws portion can be configured to only be in contact with a part of the Y-pipe having non-parallel outer surfaces. Such features allow for Y-pipes with a greater range of divergent angles to be accommodated in the device prior to its activation, whilst still keeping the Y-pipe firmly in place.

The holder portion and the jaws portion can be adjacent one another. Such a feature provides improved support to the Y-pipe along its length during the bending process.

The holder portion and the jaws portion can be moveably connected to one another. Such a feature can simplify the activation of the jaws portion, producing a more consistent bend when used to bend multiple Y-pipes of the same design.

The holder portion can be adjustable so as to be capable of accommodating Y-pipes of different diameters. Such a feature allows one device to be used on Y-pipes having a variety of diameters.

According to a second aspect, there is provided a method for decreasing the vertex angle of a Y-pipe, the method comprising, placing the Y-pipe into a device, the device comprising a first piece comprising a holder portion and a jaws portion, the jaws portion being moveable with relation to the holder portion between at least a first configuration and a second configuration, wherein, in the first configuration the holder portion and jaws portion form a holder for the Y-pipe with the jaws portion forming a first angle, and in the second configuration the holder portion and jaws portion form a holder for the Y-pipe with the jaws portion forming a second angle which is less than the first angle; a second piece configured to be inserted into a vertex of the Y-pipe, the second piece comprising a wedge portion and a punch portion, the wedge portion configured to be inserted into the vertex of the Y-pipe, and the punch portion having a tip and fitting at least partially within the wedge portion and being moveable with relation to the wedge portion between a retracted position and an extended position, wherein, in the retracted position the tip of the punch portion is in a first position with respect to the wedge portion, and in the extended position the tip of the punch portion is in a second position with respect to the wedge portion which is closer to the holder portion of the device than the first position; and a control system configured to control the movement of the jaws portion and the punch portion; using the control system to synchronise movement of the jaws portion from the first configuration to the second configuration and movement of the punch portion from the retracted position to the extended position, such that the Y-pipe held between the first piece and second piece has its vertex angle decreased.

Such a method provides an easy and reliable means for creating Y-pipes having a sharp vertex without creating points of weakness in the Y-pipe, or protrusions that will disturb the flow of fluid through the Y-pipe.

The method can further comprise the steps of retracting the punch portion, swapping the punch portion for a second punch portion with a narrower tip, moving the second punch portion into an extended position whilst the jaws of the jaws portion move to a third configuration wherein the jaws portion forms a third angle which is less than the second angle, such that the Y-pipe held between the first piece and second piece has its vertex angle further decreased. These optional additional steps allow for a greater range of Y-pipe vertex angles to be achieved.

The method can be performed with the Y-pipe at ambient temperature. Alternatively, the Y-pipe can be heated prior to performing the method. Whilst it is not necessary to provide additional heating equipment in order to heat the Y-pipe prior to bending, doing so may further improve its bendability.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Examples will now be described by way of example only, with reference to the figures, in which:

FIG. 6a is a sectional view of a schematic of an example of the device of the present disclosure in a first configuration; and FIG. 6b is a sectional view of a schematic of an example of the device of the present disclosure in a second configuration.

DETAILED DESCRIPTION OF THE DISCLOSURE

Aspects and examples of the present disclosure will now be discussed with reference to the accompanying figures. Further aspects and examples will be apparent to those skilled in the art.

Figure 1C:
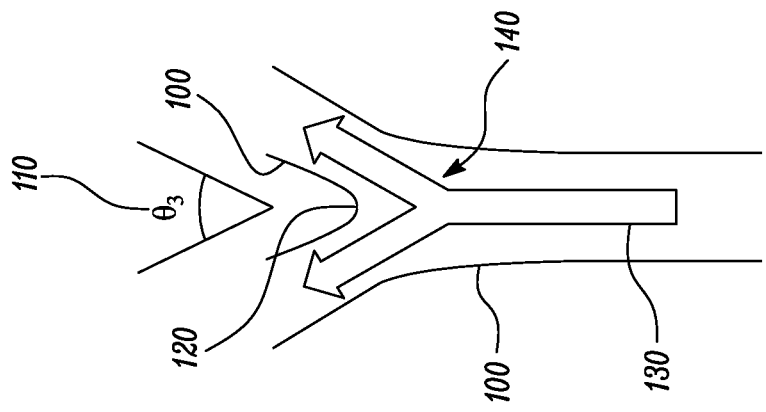
FIG. 1c is a sectional view of Y-pipe with a vertex angle $\theta_3$.
Figure 1B:
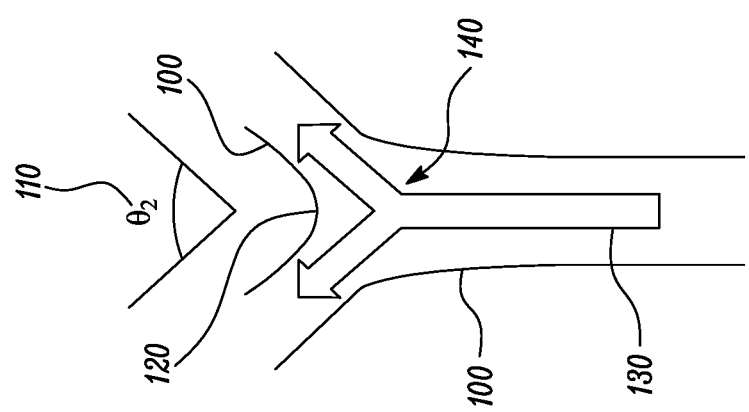
FIG. 1b is a sectional view of Y-pipe with a vertex angle $\theta_2$.
Figure 1A:
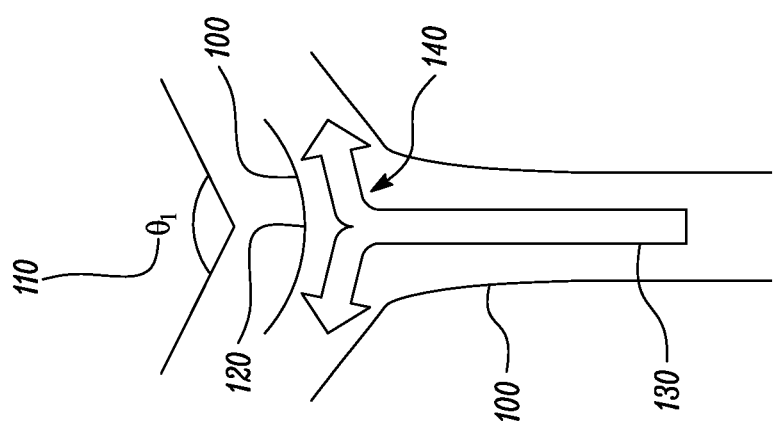
FIG. 1a is a sectional view of Y-pipe with a vertex angle $\theta_1$.

FIG. 1a shows a sectional view of a Y-pipe 100 having a vertex 120 with a vertex angle 110 equal to $\theta_1$. As $\theta_1$ is quite a large angle, and the vertex 120 of the Y-pipe has a large radius, the fluid 130 flowing towards the Y-pipe junction 140 is faced with an almost perpendicular surface at the Y vertex, and so has to turn through a large angle as it splits (as illustrated by the double-headed arrow), slowing the flow of the fluid down.

FIG. 1b shows the same situation for a Y-pipe 100 with a Y vertex 120 with vertex angle 110 equal to $\theta_2$, which is smaller than angle $\theta_1$. The radius of curvature of the Y vertex 120 is commensurately smaller as a result of the sharper angle $\theta_2$, meaning the fluid 130 does not need to turn or slow down as much when it splits at the Y-pipe junction 140.

FIG. 1c shows a sectional view of a Y-pipe 100 with a vertex angle 110 equal to $\theta_3$ at its vertex 120 which is even smaller than the angle $\theta_2$ of the Y-pipe of FIG. 1b. As $\theta_3$ is even smaller than $\theta_2$, the radius of curvature of the vertex 120 is reduced still further, and the surface area of the vertex perpendicular to the fluid flow 130 arriving at the vertex is further minimised, meaning the fluid can pass through the junction 140 even faster than for the example of FIG. 1b.

Figure 2:
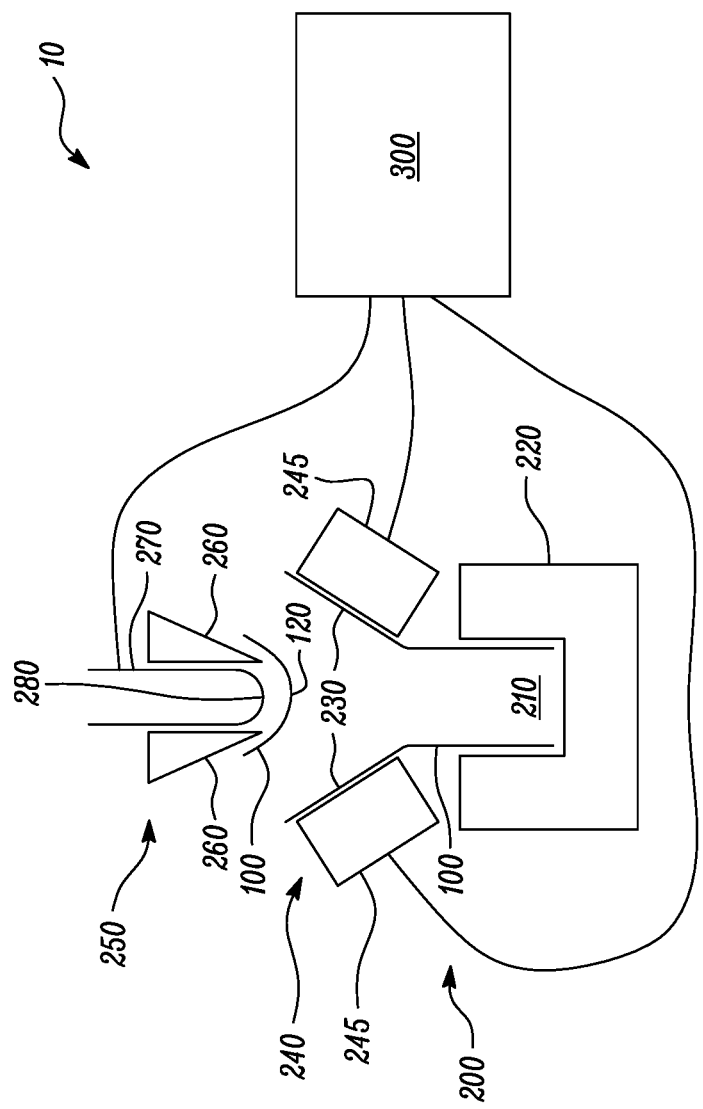
FIG. 2 is a sectional view of a schematic of an example of the device of the present disclosure.

FIG. 2 shows a schematic of an example of the device 10 of the present disclosure. The device comprises a first piece 200 and second piece 250. The Y-pipe 100 is placed and held in the first piece 200. The base 210 of the Y-pipe 100 is placed into a holder portion 220 of the first piece 200. Whilst FIG. 2 shows a gap between the base of the Y-pipe 100 and the holder portion 220, it is to be understood this is only shown for clarity, and that in reality the base portion would be firmly gripped and held in place by the holder portion 220. The holder portion 220 of the device 10 may be adjustable, such that it can be altered to accommodate different Y-pipes having different diameters. For example, the holder portion can be divided into multiple pieces, the distance between which can be altered to fit different diameters of Y-pipe. The holder portion could have an iris-type design such that the size of the aperture within the iris can be varied to fit different diameters of Y-pipe. A jaws portion 240 of the first piece 200 comprising two opposed jaws 245 is brought into contact with the divergent sides 230 of the Y-pipe 100 created by the splitting of the pipe. Again, whilst the jaws 245 of the jaws portion 240 are shown spaced from the divergent sides 230 of the Y-pipe 100, in reality they will be pressed into contact with the divergent sides 230 of the Y-pipe 100. The jaws portion is capable of movement in relation to the holder portion between at least a first configuration and a second configuration, as shall be described.

The second piece 250 comprises a wedge portion 260 and a punch portion 270. The wedge portion 260 is placed in the crook of the Y-pipe vertex 120. The punch portion 270 sits within the wedge portion, and is able to move relative to the wedge portion. The punch portion has a tip 280 at the end closest to the holder portion, which is shaped to impress a desired angular profile upon the vertex 120 of the Y-pipe 100.

The device 10 further comprises a control system 300. The control system is connected to the jaws portion 240 and the punch portion 270 so as to control their movements. The skilled person will appreciate that a variety of actuation means could be used in the device to move the jaws portions and punch portion, such as pneumatic or hydraulic pistons, for example. As such, the actuation means themselves have been omitted from the figures for clarity, and will not be discussed in any further detail.

The action of the device 10 and method of use will now be described. FIG. 3a shows the device (with the control system 300 omitted for clarity) ready to be used, with a Y-pipe placed in the holder such that the Y-pipe is held firmly in place at the base 210 by the holder portion 220, and at the divergent sides 230 by the jaws portion 240 in a first configuration, with the wedge portion 260 in contact with, or close proximity to, the vertex 120 of the Y-pipe 100.

In FIG. 3b, the control system (not shown) activates the jaws portion 240, such that the jaws 245 pivot towards one another (as indicated by the arrows), pressing against the divergent sides 230 of the Y-pipe 100. In synchrony with the activation of the jaws portion, the control system activates the punch portion 270, extending it from the wedge portion 260 towards the holder portion 220. In doing so, the tip 280 of the punch portion 270 is moved into the vertex 120 of the Y-pipe 100, and starts to exert pressure on the vertex.

Finally, in FIG. 3c, the combination of forces from the jaws portion 240 being moved into a second configuration and the movement of the punch portion 270 has caused the Y-pipe to bend, decreasing the vertex angle 110 and reducing the radius of curvature of the Y-vertex (as indicated by the small arrows). This combination of forces is particularly effective as, when the divergent sides 230 of the Y-pipe 100 are pressed together, the angle at the vertex 120 is reduced, effectively "freeing up" material in the vertex. This "freed" material can then be pushed by the tip of the punch portion to "sharpen" the vertex, reducing the radius of curvature of the vertex 120, and reducing the surface area of the vertex perpendicular to the fluid flow 130 arriving at the vertex. In use, a Y-pipe having undergone this process can channel fluid through the junction 140 faster than it would be able to prior to the undergoing the forming process. Equally, it does not suffer from points of weakness or flow disturbance (such as weld seams) within the pipe as can be the case with Y-pipes of a similar angle formed by welding two or more pieces of pipe together.

As an optional further step, where an even greater decrease in the vertex angle of the Y-pipe is desired, the process can be continued using a second punch portion 400 with a narrower tip 410 as illustrated in FIGS. 4a to 4c. In this case, the jaws portion can be closed to form an even smaller vertex angle, forming a third configuration. It will be clear this process can be repeated as often as necessary, i.e. using fourth, fifth, sixth etc. configurations of the jaws portion with successive different punch portions, until the desired vertex angle is achieved.

Optionally, the device can further comprise some means of applying a heat treatment to the Y-pipe, before and/or during the bending operation and/or between bending operations in the case where the process is repeated using further punch portions with narrower tips. As is known in the art, if manipulating a material such as a metal, heating it will tend to increase its ductility. Therefore heating the Y-pipe prior to or during bending can help with the bending process. The means for applying a heat treatment, i.e. a heating device 420 (see FIGS. 6a and 6b), can be separate from the device, such that the Y-pipe is heated outside of the device and then placed in the device for bending. Alternatively the means can be integral to the device (for example, the holder portion, jaws portion, and/or the wedge portion 260) so as to apply heat to the Y-pipe by conduction so that the Y-pipe does not need to be removed from the device during the bending process. Suitable heating devices will be known to the person skilled in the art. It will be appreciated that such heating devices 420 could equally be used with systems such as the examples shown in FIGS. 2, 3 and 4.

FIG. 4a shows the punch portion 270 being retracted through the wedge portion 260 such that the tip 280 of the punch portion is no longer exerting pressure on or in contact with the vertex 120 of the Y-pipe 100. Optionally the wedge portion 260 can also be retracted from the vertex 120 at this point to facilitate the removal of the punch portion. The punch portion 270 can then be removed from the wedge portion, and replaced with a second punch portion 400 having a narrower tip 410 as shown in FIG. 4b. Once this is done, and the wedge portion has been put back in position if it was moved, the process of can be repeated, as shown in FIG. 4c, with the control system (not shown) activating the jaws portion 240 such that the jaws 245 pivot towards one another (as indicated by the arrows), pressing against the divergent sides 230 of the Y-pipe 100, whilst in synchrony the control system activates the second punch portion 400, extending it from the wedge portion 260 towards the holder portion 220. Again, the combination of forces from the jaws portion 240 and second punch portion 400 will cause the Y-pipe to bend further, freeing more material in the vertex which is pushed further by the tip of the punch portion to further sharpen the vertex, further decreasing the vertex angle 110 and further reducing the radius of curvature of the Y-vertex (as indicated by the small arrows in FIG. 4c). It will be clear to the skilled person this process of using sharper-tipped punch portions can be repeated as necessary using further configurations of the jaws portion until the desired vertex profile is arrived at.

Figure 5:
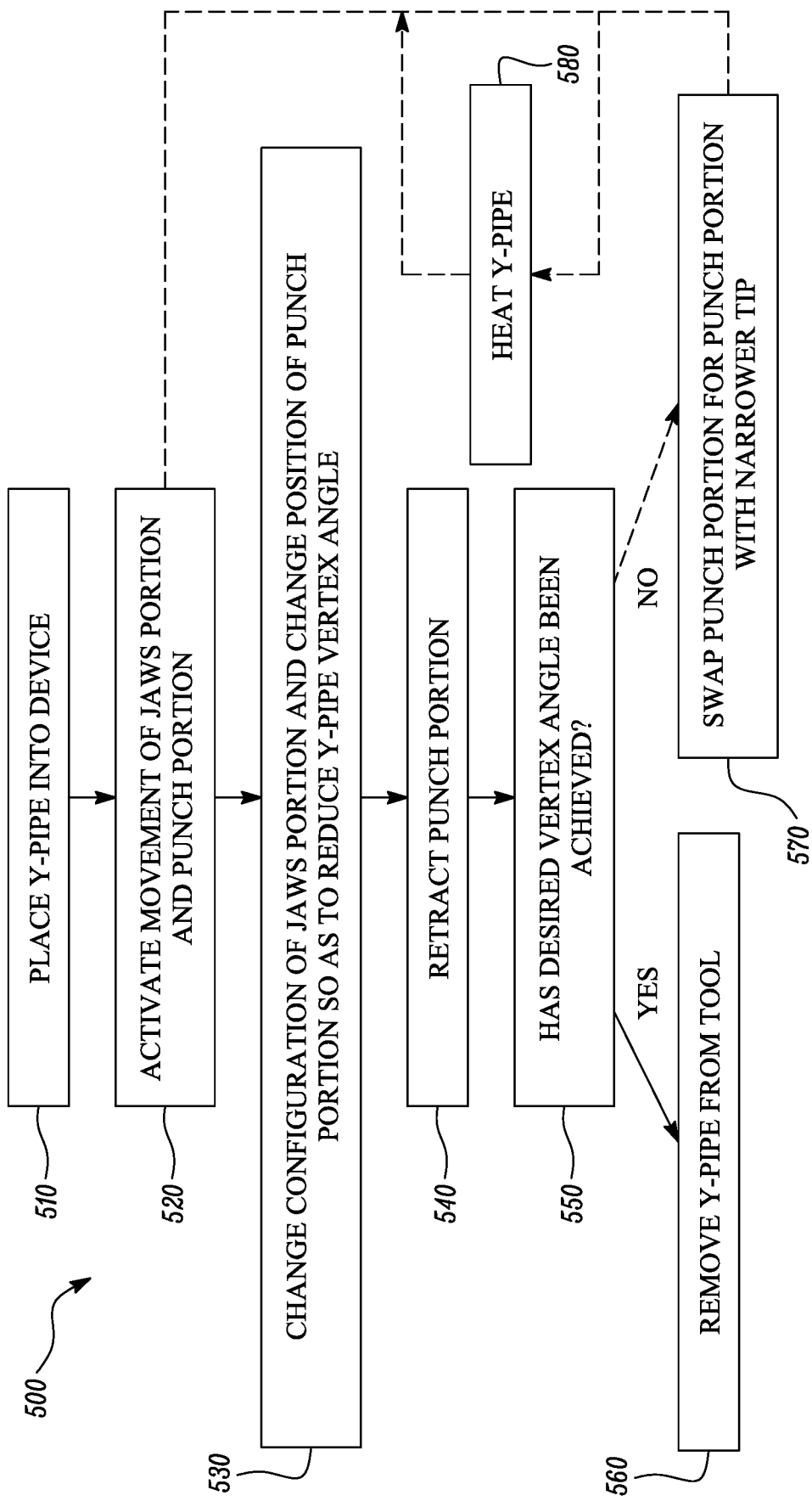
FIG. 5 shows a flow diagram to illustrate an example of the method of the present disclosure.

FIG. 5 shows a flow chart illustrating a method 500 associated with the device 10 as described by example above. At a first step 510, the Y-pipe is placed into the first piece 200 and second piece 250 of the device, as shown in FIG. 2, ready to be processed. The Y-pipe may have already been heated prior to being placed into the device, or it may be heated in the device, if desired or necessary. In the second step 520, the control system 300 activates the jaws portion and the punch portion in synchrony so as to apply pressure at the vertex of the Y-pipe whilst simultaneously pushing the legs of the Y-pipe together, as illustrated in FIG. 3b. As a result, at step 530, the Y-pipe vertex angle is reduced, as illustrated in FIG. 3c.

Once the Y-pipe vertex angle has been reduced, the punch portion can be retracted from the Y-pipe vertex as per step 540. At step 550, the user checks to see if the desired vertex angle has been achieved. If it has, the Y-pipe can be removed from the tool for use, as per step 560. If the user wishes to reduce the Y-pipe vertex angle still further, the punch portion can be swapped out for a punch portion with a narrower tip, as per optional step 570. The user also has the option to heat the Y-pipe prior to the next stage in the process as per step 580. The method 500 then returns back to step 520, wherein the jaws 240 and punch 270 portions are again activated by the control system 300 in order to further reduce the Y-pipe vertex angle. The method can be repeated as often as necessary until the desired Y-pipe vertex angle is achieved.

Figure 3:
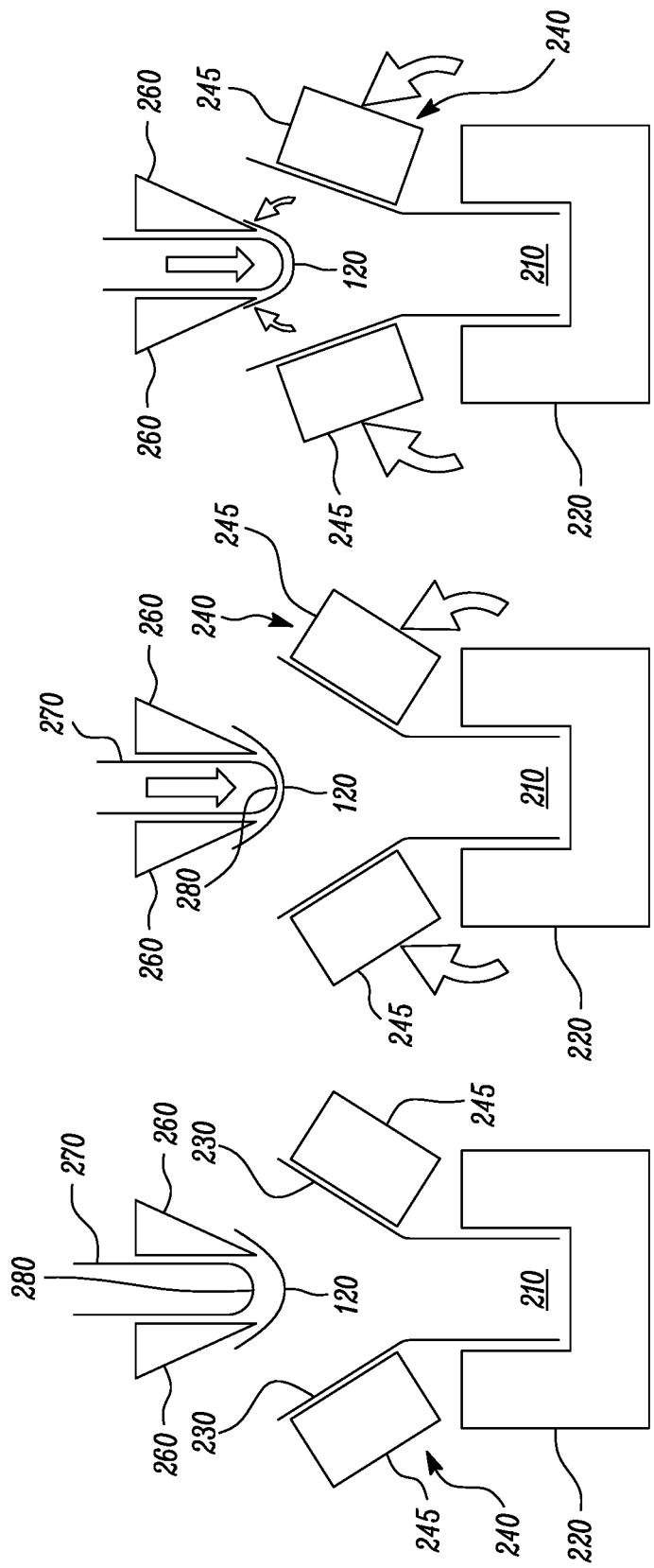
FIG. 3a shows the first stage of the method of the present disclosure.
FIG. 3b shows a second stage of the method of the present disclosure.
FIG. 3c shows a third stage of the method of the present disclosure.
Figure 4:
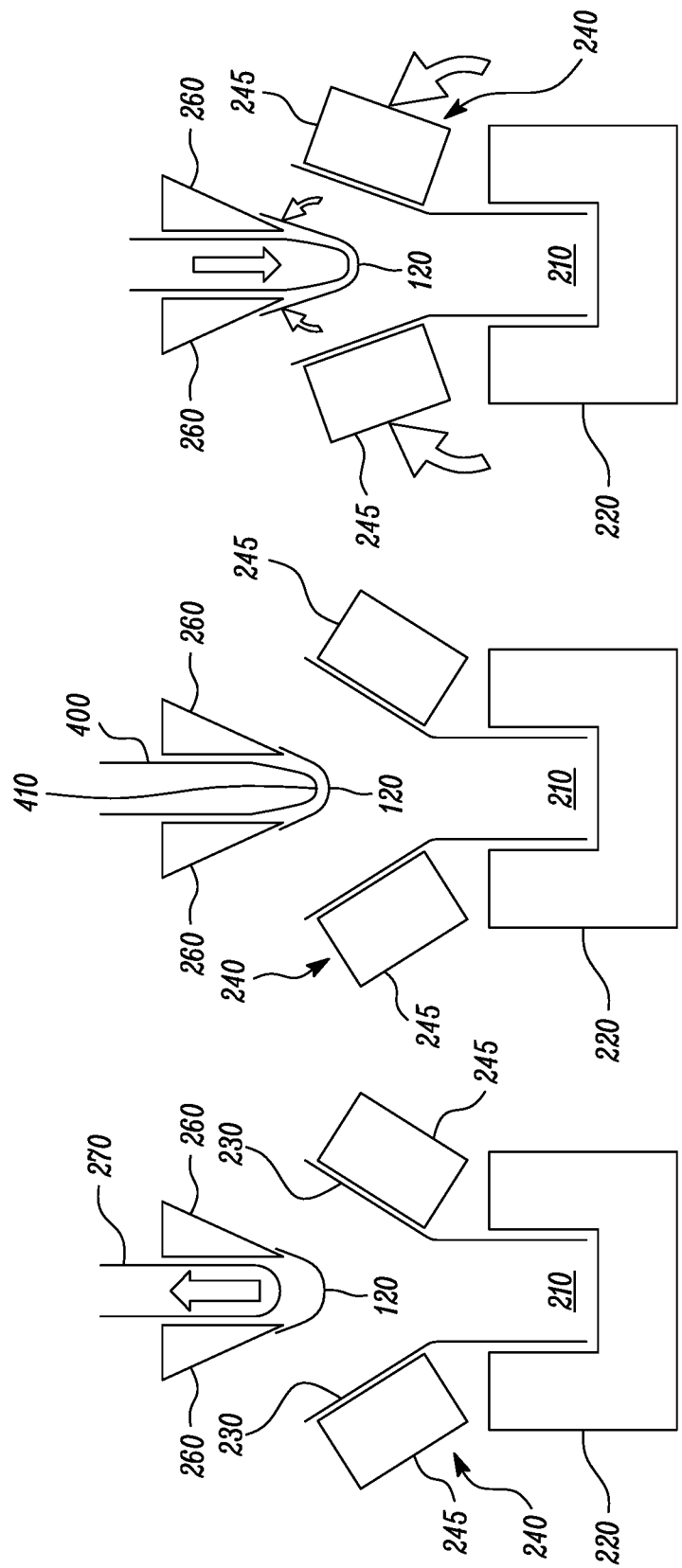
FIG. 4a shows a first optional stage of the method of the present disclosure.
FIG. 4b shows a second optional stage of the method of the present disclosure.
FIG. 4c shows a third optional stage of the method of the present disclosure.

In FIGS. 2, 3, and 4, the holder portion 220 is shown as only being in contact with the cylindrical base of the Y-pipe, and not extending to the region where the Y-pipe starts to diverge, and the outer surfaces of the Y-pipe start to diverge. Equally, the jaws portion 240 is shown having contact only with a portion of the part of the Y-pipe where the outer surfaces are diverging, and as such are non-parallel. The skilled person will appreciate that the gap shown between the holder portion and the jaws portion in FIGS. 2, 3, and 4 is not essential, and that various designs of the holder portion are possible without affecting the performance of the device, or the method used to operate it. For example, the holder portion and the jaws portion could be adjacent, in contact, or even moveably connected, i.e. by some sort of hinge mechanism.

FIGS. 6a and 6b show example examples where the holder portion 220 and jaws portion 240 are shaped so as to be adjacent to one another, providing maximum support to the Y-pipe during the bending operation. By extending the holder portion along as much of the cylindrical base of the Y-pipe as possible, the support of the base of the Y-pipe is optimised during the bending process. Equally, by extending the jaws along as much of the non-parallel outer surfaces of the Y-pipe as possible, the divergent section of the Y-pipe receives optimal support during the bending process. Such a configuration, where the Y-pipe is supported at all points between the holder portion 220 and the jaws portion 245, can be used in combination with a hydroforming process as is known in the art.

During a hydroforming process, water is pushed through the Y-pipe at high pressure whilst the shape of the pipe is manipulated. If hydroforming was used in combination with the device or method of the present disclosure, then water would be pumped through the Y-pipe at high pressure whilst the bending of the Y-pipe is taking place. In order to facilitate the input of high-pressure water, the holder portion 220 must have an aperture 215 within it that allows water to pass through into the base 210, up to the vertex and along the legs formed by the split in the pipe. An example of a configuration with such an aperture is shown in FIG. 6. By supporting the pipe at all points between the holder portion 220 and the jaws portion 240, i.e. by not having a gap between the holder portion 220 and the jaws portion 240, the risk of the high-pressure water causing the Y-pipe to bulge out in the gap between the holder portion 220 and jaws portion 240 (as shown for example in the configuration of FIGS. 2, 3 and 4) is eliminated. It will of course be appreciated that the holder portion 220 with the aperture 215 could equally be used in a non-hydroforming process or device, and/or could be readily substituted into any of FIG. 2, 3, or 4 without affecting their performance or the method of using them.

It will be understood that the disclosure is not limited to the examples above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A device for decreasing a vertex angle of a Y-pipe, the device comprising:
   a first piece configured to hold the Y-pipe, the first piece comprising a holder portion and a jaws portion, the jaws portion comprising a pair of jaws that are configured to pivot toward each other and compress the Y-pipe therebetween, the pair of jaws being pivotable with respect to the holder portion between at least a first configuration and a second configuration, wherein, in the first configuration the holder portion and the pair of jaws form a holder for the Y-pipe with the pair of jaws forming a first angle, and in the second configuration the holder portion and pair of jaws form a holder for the Y-pipe with the pair of jaws forming a second angle which is less than the first angle; and
   a second piece configured to be inserted into the vertex of the Y-pipe, the second piece comprising a wedge portion and a punch portion, the wedge portion being configured to be inserted into the vertex of the Y-pipe and the punch portion having a tip and fitting at least partially within the wedge portion and being moveable with relation to the wedge portion between a retracted position and an extended position, wherein, in the retracted position the tip of the punch portion is in a first position with respect to the wedge portion, and in the extended position the tip of the punch portion is in a second position with respect to the wedge portion, the second position being closer to the holder portion of the device than the first position;
   the device further comprising a control system configured to control the movement of the jaws portion and the punch portion such that the movement of the jaws portion between the first configuration and the second configuration is synchronised with the movement of the punch portion between the retracted position and the extended position such that the Y-pipe held between the first piece and second piece has its vertex angle decreased.

2. The device of claim 1, wherein the punch portion is swappable, such that different punch portions having different tip profiles can be used within the wedge portion.

3. The device of claim 1, wherein the holder portion is configured to only be in contact with a part of the Y-pipe that has a cylindrical shape.

4. The device of claim 1, wherein the jaws portion is configured to only be in contact with a part of the Y-pipe having non-parallel outer surfaces.

5. The device of claim 1, wherein the holder portion and the jaws portion are adjacent one another.

6. The device of claim 1, wherein the holder portion and the jaws portion are moveably connected to one another.

7. The device of claim 1, wherein the holder portion is adjustable so as to be capable of accommodating Y-pipes of different diameters.

8. The device of claim 1, further comprising a heater configured to apply a heat treatment to the Y-pipe.

9. A method for decreasing a vertex angle of a Y-pipe, the method comprising:
   placing the Y-pipe into a device, the device comprising: a first piece comprising a holder portion and a jaws portion, the jaws portion being moveable with relation to the holder portion between at least a first configuration and a second configuration, wherein, in the first configuration the holder portion and jaws portion form a holder for the Y-pipe with the jaws portion forming a first angle, and in the second configuration the holder portion and jaws portion form a holder for the Y-pipe with the jaws portion forming a second angle which is less than the first angle; a second piece configured to be inserted into a vertex of the Y-pipe, the second piece comprising a wedge portion and a punch portion, the wedge portion configured to be inserted into the vertex of the Y-pipe, and the punch portion having a tip and fitting at least partially within the wedge portion and being moveable with relation to the wedge portion between a retracted position and an extended position, wherein, in the retracted position the tip of the punch portion is in a first position with respect to the wedge portion, and in the extended position the tip of the punch portion is in a second position with respect to the wedge portion which is closer to the holder portion of the device than the first position; and a control system configured to control the movement of the jaws portion and the punch portion; and using the control system to synchronise movement of the jaws portion from the first configuration to the second configuration and movement of the punch portion from the retracted position to the extended position, such that the Y-pipe held between the first piece and second piece has its vertex angle decreased.

10. The method of claim 9, further comprising the steps of:

retracting the punch portion;

swapping the punch portion for a second punch portion with a narrower tip; and moving the second punch portion into an extended position whilst the jaws of the jaws portion move to a third configuration wherein the jaws portion forms a third angle which is less than the second angle, such that the Y-pipe held between the first piece and second piece has its vertex angle further decreased.

11. The method of claim 9, wherein the method is performed with the Y-pipe at ambient temperature.

12. The method of claim 9, wherein the Y-pipe is heated prior to and/or whilst performing the method.

* * * * *